United States Patent
Yuan

(10) Patent No.: US 9,309,914 B2
(45) Date of Patent: Apr. 12, 2016

(54) LOW-PROFILE RIVET-LIKE FASTENER

(75) Inventor: Wu Sheng Yuan, Pingjhen (TW)

(73) Assignee: Sherex Fastening Solutions, LLC, Tonawanda, NY (US)

( * ) Notice: Subject to any disclaimer, the term of this patent is extended or adjusted under 35 U.S.C. 154(b) by 595 days.

(21) Appl. No.: 13/696,429

(22) PCT Filed: Jul. 7, 2010

(86) PCT No.: PCT/US2010/001915
§ 371 (c)(1),
(2), (4) Date: Nov. 6, 2012

(87) PCT Pub. No.: WO2012/005715
PCT Pub. Date: Jan. 12, 2012

(65) Prior Publication Data
US 2013/0051952 A1    Feb. 28, 2013

(51) Int. Cl.
*F16B 37/04*    (2006.01)
*F16B 37/06*    (2006.01)
*F16B 41/00*    (2006.01)

(52) U.S. Cl.
CPC .............. *F16B 37/065* (2013.01); *F16B 41/002* (2013.01)

(58) Field of Classification Search
CPC ...... F16B 37/06; F16B 37/064; F16B 37/065; F16B 37/067; F16B 5/0233; F16B 41/002
See application file for complete search history.

(56) References Cited

U.S. PATENT DOCUMENTS

| 2,949,143 | A | * | 8/1960 | Shur | 411/353 |
| 3,698,278 | A | * | 10/1972 | Trembley | 411/34 |
| 3,765,465 | A | * | 10/1973 | Gulistan | 411/353 |
| 3,973,317 | A | * | 8/1976 | Gulistan | B25B 27/14 29/229 |
| 4,735,536 | A | * | 4/1988 | Duran | F16B 5/01 411/103 |
| 4,747,738 | A | * | 5/1988 | Duran | F16B 5/0208 411/107 |
| 4,875,815 | A | * | 10/1989 | Phillips, II | 411/38 |
| 4,906,153 | A | * | 3/1990 | Duran | F16B 5/0208 411/103 |
| 6,224,309 | B1 | * | 5/2001 | Yamamoto | 411/11 |
| 7,393,169 | B2 | * | 7/2008 | Subenbach | 411/38 |
| 2004/0179920 | A1 | * | 9/2004 | Ando et al. | 411/501 |
| 2007/0258786 | A1 | * | 11/2007 | Orszagh et al. | 411/34 |
| 2008/0181744 | A1 | * | 7/2008 | Orszagh et al. | 411/52 |

FOREIGN PATENT DOCUMENTS

CN    201368101    12/2009

* cited by examiner

*Primary Examiner* — Gary Estremsky
(74) *Attorney, Agent, or Firm* — Phillips Lytle LLP

(57) ABSTRACT

A low-profile rivet-like fastener (10) is adapted to be mounted in a hole (19) provided through a wall (15). The improved fastener broadly includes: an elongated tubular body (11), a nut (12), a ring (13), and a retainer (14). The body has a front end and a rear end. A flange (22) extends outwardly from the body adjacent the front end. The body has an inwardly-extending lug (27) adjacent the body rear end. The nut (12) has a head portion (30) and a collar portion (31) extending forwardly from the head portion. The collar portion (31) has an intermediate portion passing through the lug and terminates in a marginal end portioned forwardly of the lug. The ring (13) loosely surrounds the collar marginal end portion. The retainer (14) prevents the ring from separating from the collar marginal end portion.

20 Claims, 4 Drawing Sheets

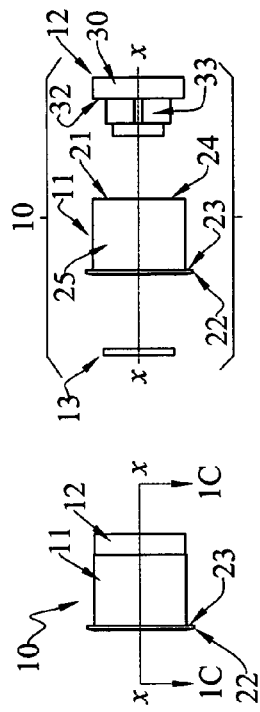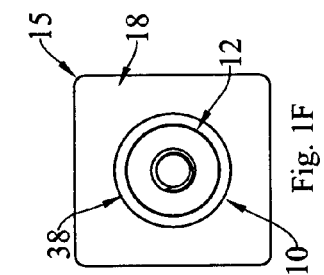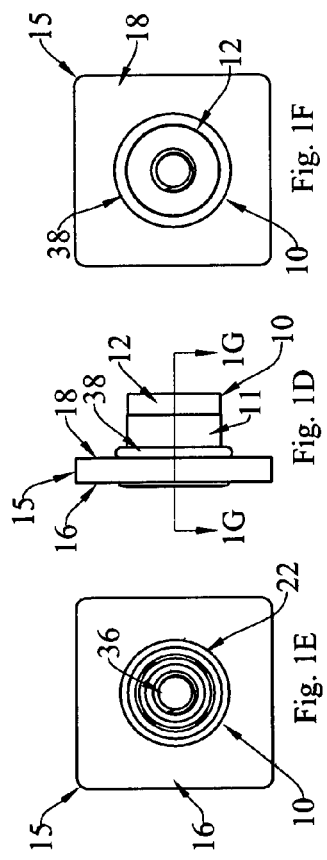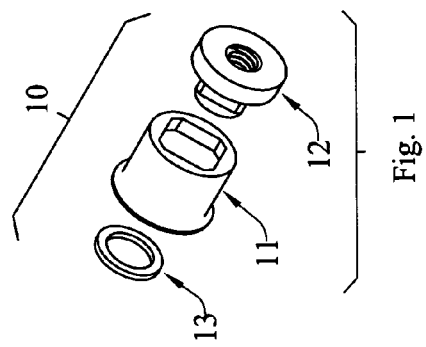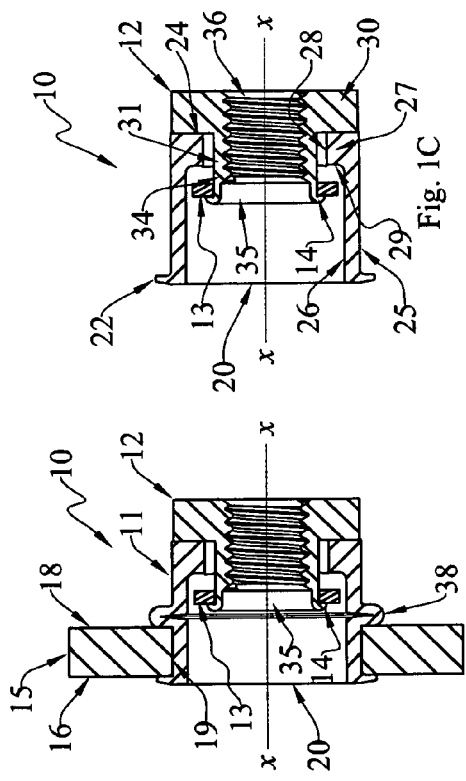

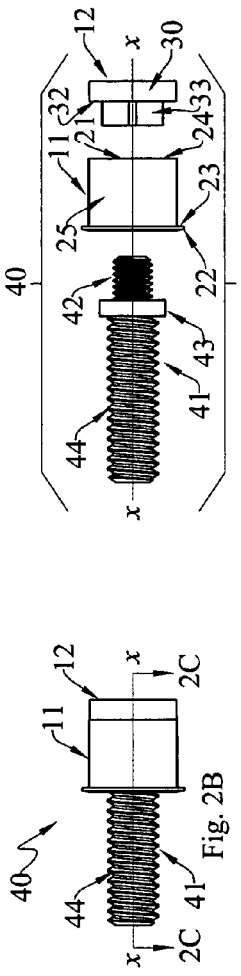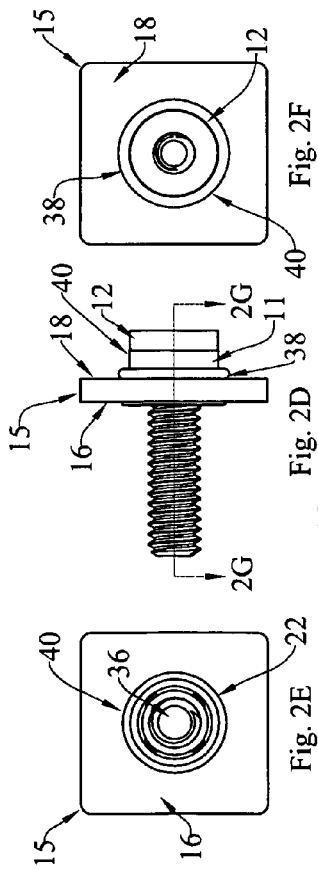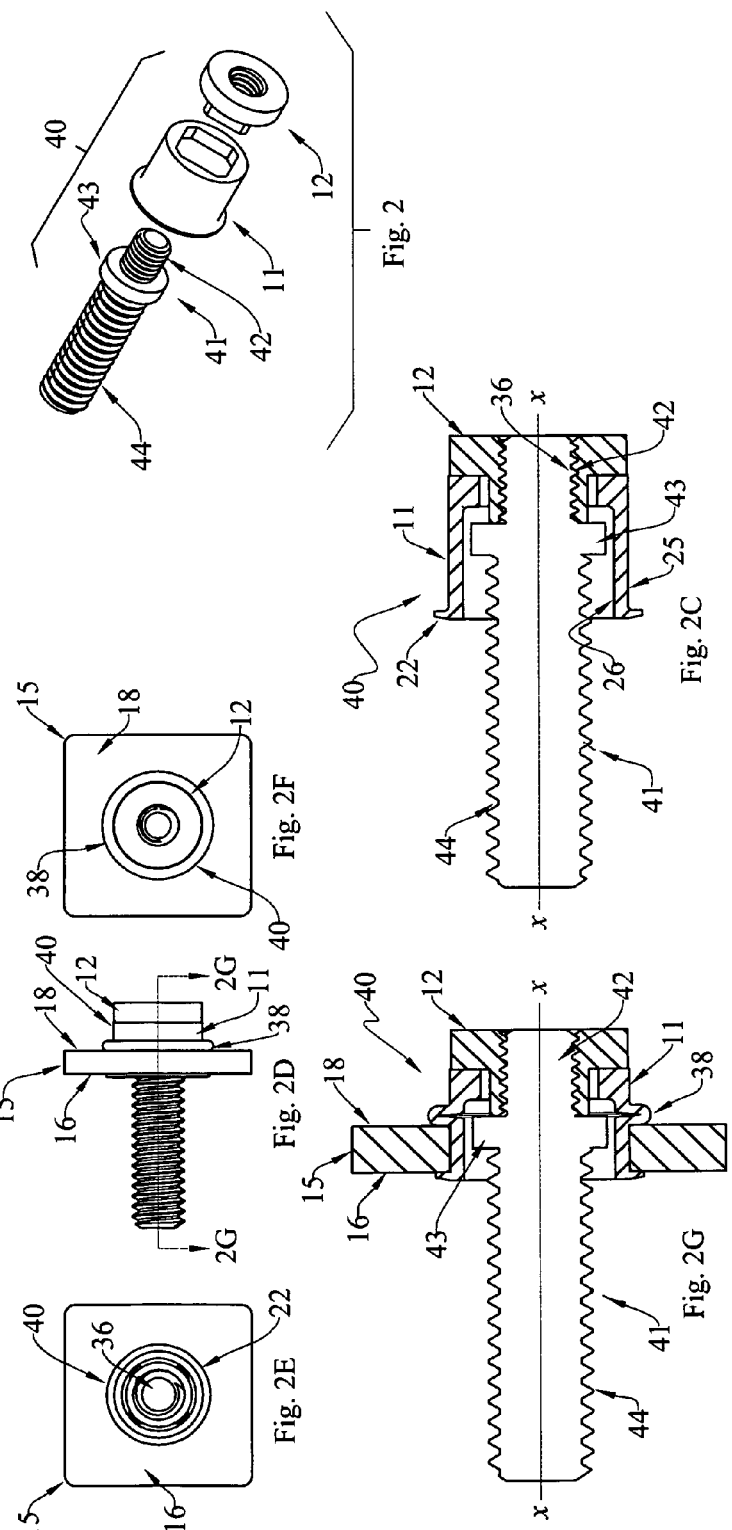

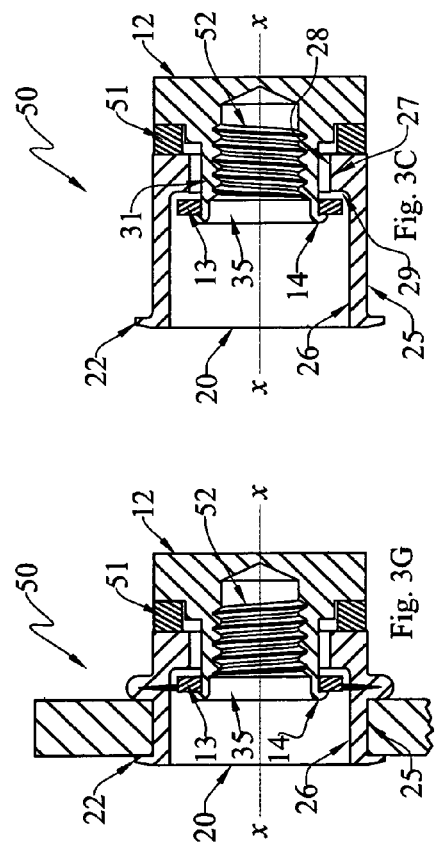

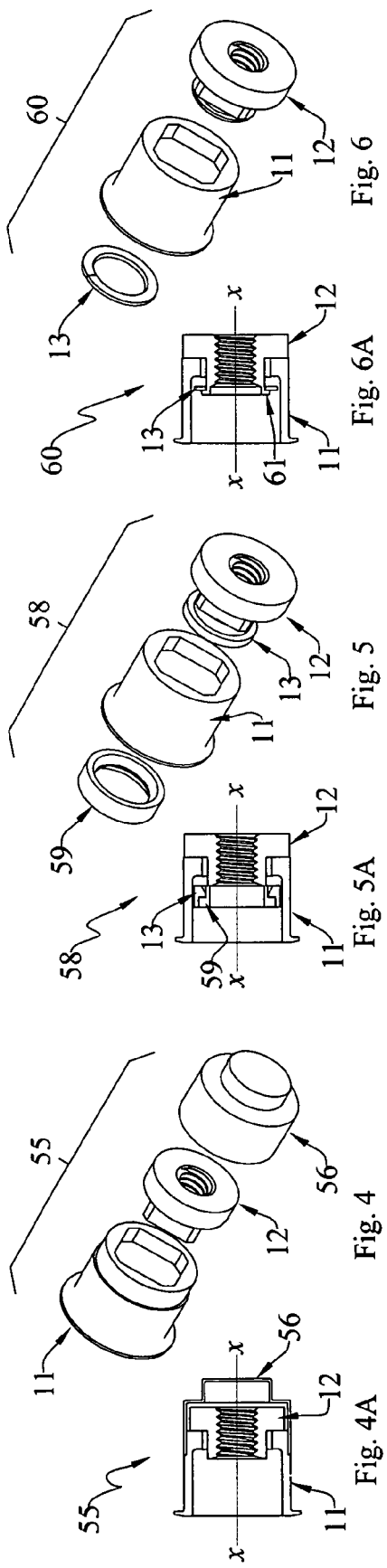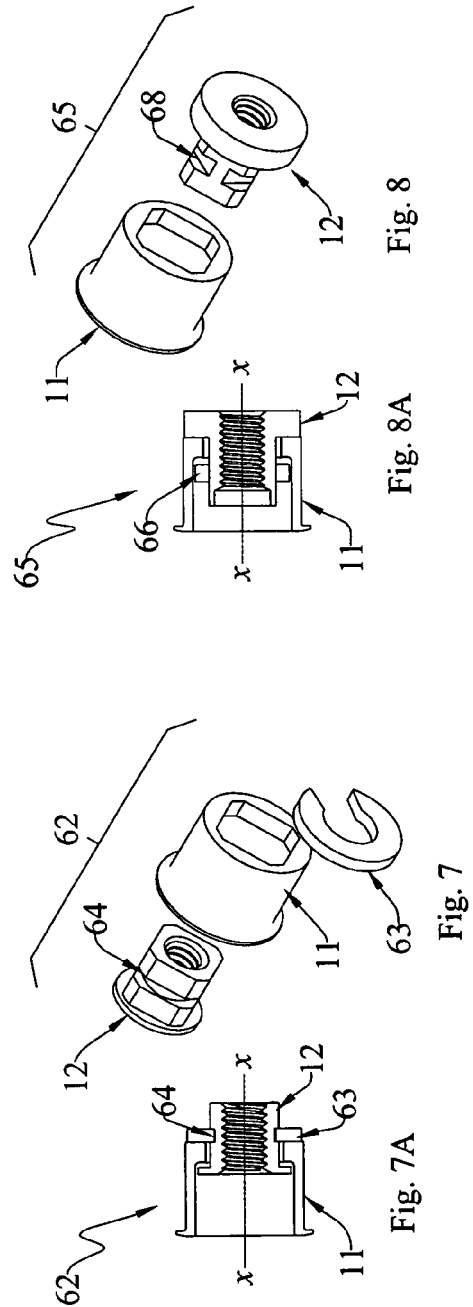

LOW-PROFILE RIVET-LIKE FASTENER

TECHNICAL FIELD

The present invention relates generally to the field of fasteners, and, more particularly, to improved low-profile rivet-like fasteners that have a body adapted to be passed through a wall opening and that is adapted to be selectively deformed plastically outwardly into engagement with the wall.

BACKGROUND ART

Fasteners exist in a myriad of different forms and shapes.

With a rivet, a head engages one side of a wall about a hole or opening, an intermediate portion of the body passes through the wall opening, and a marginal end portion of the body extends beyond the wall. This marginal end portion is thereafter deformed plastically outwardly into tight engagement with the opposite side of the wall.

Prior art rivet-like fasteners are shown and described in US 2007/0258786 A1 and US 2008/0181744 A1.

There is believed to be a continuing need for improved rivet-like fasteners.

DISCLOSURE OF THE INVENTION

With parenthetical reference to the corresponding parts, portions or surfaces of the disclosed embodiments, merely for purposes of illustration and not by way of limitation, the present invention provides improved low-profile rivet-like fasteners (10) that are adapted to be mounted in a hole (19) provided through a wall (15). The wall has a forwardly-facing surface (16) and an opposite rearwardly-facing surface (18).

The improved fastener broadly includes: an elongated tubular body (11) having a front end and a rear end, the body having a flange (22) extending outwardly from the body adjacent the front end, the flange having a rearwardly-facing surface (23) adapted to abut a marginal portion of the wall forwardly-facing surface (16) about the hole (19), the body rear end having a rearwardly-facing surface (24), the body also having an inwardly-extending lug (27) adjacent the body rear end, the axial extent of the lug being defined between the body rearwardly-facing surface (24) and a forwardly-facing annular surface (29) on the body; a nut (12) having a head portion (30) and a collar portion (31) extending forwardly from the head portion, the head portion having a forwardly-facing abutment surface (32) adapted to face toward the body rearwardly-facing surface (24), the collar portion having an intermediate portion passing through the lug and terminating in an end; a ring (13) surrounding the collar intermediate portion; and a retainer (14) associated with the collar intermediate portion for preventing the ring from separating from the collar intermediate portion.

The body rearwardly-facing surface may be annular.

The body forwardly-facing surface may also be annular.

The lug may have an inwardly-facing polygonal surface (28), and the collar intermediate portion may have an outwardly-facing polygonal surface (33) arranged to face toward the lug polygonal surface to prevent relative rotation between the nut and body.

The nut may have an axial through-hole (36), which may possibly be tapped. A member (41) may have an externally-threaded marginal end portion (43) matingly received in the tapped through-hole (36), may have an outwardly-extending annular flange (43), and may have another portion (44) extending away from the member externally-threaded marginal end portion. The member other portion may be externally-threaded. The flange (43) may be formed integrally with the member (41), or may be formed as a separate element and simply threaded onto the member, as desired.

The nut (12) may possibly have a blind hole (52), which may be tapped. A member (41) having an externally-threaded marginal end portion (42) may be matingly received in the tapped hole, may have an outwardly-extending annular flange (43), and may have another portion (44) extending away from the member externally-threaded marginal end portion (42). This member other portion (44) may also be externally-threaded. Here again, the flange (43) may be formed integrally with the member (41), or may be formed as a separate element and simply threaded onto the member, as desired.

Radial space may be provided between the body lug and the collar intermediate portion to permit the nut to move radially relative to the body.

The nut collar portion may be formed integrally with the nut head portion.

An intermediate portion of the body may be adapted to be selectively deformed plastically outwardly (38) to engage a marginal portion of the rearwardly-facing wall surface (18) about the hole (19) to hold the fastener (10) to the wall.

The improved fastener may further include a washer (51) acting between the body second end and the nut head portion. This washer may be formed of a resilient material.

A portion (14) of the collar portion may be selectively deformed plastically outwardly for preventing the ring (13) from unintentionally separating from the collar intermediate portion.

The ring may be an annular member, a C-shaped member, or may have some other shape.

The collar portion may be provided with a groove to receive a portion of the ring, or C-shaped member.

Accordingly, the general object of the invention is to provide an improved fastener.

Another object is to provide an improved low-profile rivet-like fastener that is adapted to be mounted in a hole provided through a wall.

These and other objects and advantage will become apparent from the foregoing and ongoing written specification, the drawings and the appended claims.

BRIEF DESCRIPTION OF THE DRAWINGS

FIG. 1 is an exploded isometric view of a pre-assembled first form of the improved fastener.

FIG. 1A is a side elevation of the pre-assembled fastener shown in FIG. 1.

FIG. 1B is a view generally similar to FIG. 1A, but showing the fastener as having been assembled.

FIG. 1C is an enlarged-scale horizontal longitudinal sectional view thereof, taken generally on line 1C-1C of FIG. 1B.

FIG. 1D is a side elevation of the assembled fastener shown in FIG. 1B, and showing the fastener as being operatively mounted on a wall.

FIG. 1E is a left end elevation of the wall-mounted fastener shown in FIG. 1D.

FIG. 1F is a right end elevation of the wall-mounted fastener shown in FIG. 1D.

FIG. 1G is an enlarged-scale horizontal longitudinal sectional view thereof, taken generally on line 1G-1G of FIG. 1D, this view is showing the wall as being captured between the flange and the rivet-like fold in the body.

FIG. 2 is an exploded isometric view of a pre-assembled second form of the improved fastener.

FIG. 2A is a side elevation of the pre-assembled exploded fastener shown in FIG. 2.

FIG. 2B is a view similar to FIG. 2A, but showing the fastener as having been assembled.

FIG. 2C is an enlarged-scale horizontal longitudinal sectional view thereof, taken generally on line 2C-2C of FIG. 2B, and showing the assembled fastener prior to being mounted on a wall.

FIG. 2D is a side elevation of the fastener assembly shown in FIG. 2B, and showing the fastener as being mounted on a wall.

FIG. 2E is a left end elevation of the wall-mounted fastener shown in FIG. 2D.

FIG. 2F is a right end elevation of the wall-mounted fastener shown in FIG. 2D.

FIG. 2G is an enlarged-scale horizontal longitudinal sectional view thereof, taken generally on line 2G-2G of FIG. 2D, and showing the fastener as being mounted on a portion of wall.

FIG. 3 is an isometric exploded view of a pre-assembled third form of the improved fastener.

FIG. 3A is a side elevation of the pre-assembled fastener shown in FIG. 3.

FIG. 3B is a side elevation of the fastener shown in FIG. 3A, but showing the fastener as having been assembled.

FIG. 3C is an enlarged-scale horizontal longitudinal sectional view thereof, taken generally on line 3C-3C of FIG. 3B.

FIG. 3D is a side elevation of the assembled fastener, and showing the fastener as being mounted on a wall.

FIG. 3E is a left end elevation of the wall-mounted fastener shown in FIG. 3D.

FIG. 3F is a right end elevation of the wall-mounted fastener shown in FIG. 3D.

FIG. 3G is an enlarged-scale horizontal longitudinal sectional view thereof, taken generally on line 3G-3G of FIG. 3D.

FIG. 4 is an exploded isometric view of a pre-assembled fourth form of the improved fastener.

FIG. 4A is a horizontal longitudinal sectional view of the assembled fastener shown in FIG. 4.

FIG. 5 is an exploded isometric exploded view of a pre-assembled fifth form of the improved fastener.

FIG. 5A is a horizontal longitudinal sectional view of the assembled fastener shown in FIG. 5.

FIG. 6 is an exploded isometric exploded view of a pre-assembled sixth form of the improved fastener.

FIG. 6A is horizontal longitudinal sectional view of the assembled fastener shown in FIG. 6.

FIG. 7 is an exploded isometric exploded view of a pre-assembled seventh form of the improved fastener.

FIG. 7A is a horizontal longitudinal sectional view of the assembled fastener shown in FIG. 7.

FIG. 8 is an exploded isometric exploded view of a pre-assembled eighth form of the improved fastener.

FIG. 8A is a horizontal longitudinal sectional view of the assembled fastener shown in FIG. 8.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, a first form of the improved fastener is shown in FIGS. 1-1G, a second in FIGS. 2-2G, a third in FIGS. 3-3G, a fourth in FIGS. 4-4A, a fifth in FIGS. 5-5A, a sixth in FIGS. 6-6A, a seventh in FIGS. 7-7A, and an eighth in FIGS. 8-8A. However, it should be clearly understood that the illustrated forms are not exhaustive of all of the various combination and permutations that the form of the improved fastener may take.

The various illustrated embodiments will now be described in a seriatim herebelow. In the following description, reference will be made to a "pre-assembled fastener" (i.e., to the various parts and components of the fastener prior to assembly), to an "assembled fastener" (i.e., to an assembly of those various parts and components), and to a "wall-mounted fastener" (i.e., to the assembled fastener when passed through a wall opening and after a portion of the thin-walled body has been deformed plastically so that the wall is gripped between the body flange and fold).

First Form (FIGS. 1-1G)

A first form of the improved fastener is shown in FIGS. 1-1G.

As best shown in FIGS. 1 and 1A, this first form is generally indicated at 10, and broadly includes an elongated tubular body 11, a nut 12, a ring 13, and a retainer 14 (as depicted in FIGS. 1C and 1G).

Fastener 10 is adapted to be mounted in a hole provided through a wall, generally indicated at 15. The wall has a forwardly-facing surface 16 and an opposite rearwardly-facing surface 18. In FIG. 1G, the wall is shown as having an inwardly-facing horizontal cylindrical surface 19 about the hole.

As best shown in FIGS. 1, 1A and 1C, the body 11 is shown as being a horizontally-elongated specially-configured tubular member having a leftwardly-facing annular vertical front end 20, and a rightwardly-facing annular vertical rear end 21. The body is also shown as having an annular flange 22 extending outwardly from its outer surface adjacent its leftward front end. This flange has a rightwardly-facing annular vertical surface 23 adapted to face toward and abut a marginal portion of the forwardly-facing wall surface 16 about the hole. The body rear end has a rearwardly-facing surface 24. The body has an outwardly-facing horizontal cylindrical surface 25 extending rightwardly from the inner margin of flange surface 23 and joining the outer margin of body right end face 24. The body also has an inner surface which includes an inwardly-facing horizontal cylindrical surface 26 extending rightwardly from the inner margin of front end face 20, and which terminates in an inturned annular lug 27 having an inwardly-facing polygonal surface 28. The axial extent of this lug is defined between body rearwardly-facing surface 24 and a forwardly-facing annular vertical surface 29. Body surfaces 25, 26 define therebetween a thin-walled intermediate portion of the body.

Nut 12 is shown as being a specially-configured horizontal member having a head portion 30 and having a collar portion 31 extending forwardly therefrom. The head portion has a leftwardly-facing annular vertical abutment surface 32 adapted to face toward the body rearwardly-facing surface 24. The collar portion 31 is shown as having an outwardly-facing polygonal portion 33 and a portion 34 continuing leftwardly therefrom and terminating in a marginal end portion 35. In FIGS. 1C and 1G, this marginal end portion 35 is shown as having been deformed, as by being bent or rolled plastically outwardly, so as to form a radially-enlarged head to retain ring 13 on the collar intermediate portion. This out-turned marginal end portion 35 or head then forms the retainer 14 for preventing the ring from separating from the collar intermediate portion. In this embodiment, the nut is shown as having an internally-threaded axial through-hole 36.

The first form may be assembled as shown. More particularly, the nut may be mounted so as to engage the body, and the ring 13 may be loosely slipped over the nut collar portion. Thereafter, the marginal end portion of 35 of the collar may be bent or deformed outwardly so as to form the head or retainer 14 for preventing the ring from unintentionally separating from the nut. In this pre-installed fastener assembly, the various parts are held loosely together, but are prevented from unintended separation.

The assembled fastener may be pushed rightwardly through a hole in a wall. Thereafter, a suitable tool (not shown) may engage the threaded portion of the nut, and may be pulled forwardly relative to the flange so as to cause an intermediate portion of the thin-walled body to deform plastically outwardly and to form a rivet-like fold, as indicated at 38, which engages the rearwardly-facing wall surface 18, as shown in FIG. 1G.

Once mounted on the wall, the various members may be threadably engaged with the nut. For example, the double-threaded stud 41 shown in the second embodiment, may be engaged with the nut. Alternatively, other types of threaded members may also be engaged with the nut, as desired. These members may be engaged with the fastener either before or after the body has been deformed into tight engagement with the wall.

Therefore, this first embodiment 10 broadly includes a body 11, a nut 12, a ring 13 slipped over the collar portion of the nut, with a marginal end portion of the collar portion deformed outwardly so as to form a retainer 14 for preventing the ring from separating from the collar.

Second Form (FIGS. 2-2G)

A second form of the improved fastener is shown in FIGS. 2-2G.

As best shown in FIGS. 2 and 2A, this second form is generally indicated at 40, and broadly includes an elongated tubular body 11, a nut 12, and a threaded member 41.

The body 11 of this second form is substantially the same as the body of the first embodiment. Thus, the same reference numerals have been used in FIGS. 2-2G to refer to the corresponding structure previously described with respect to the first form. In the second form, however, retaining ring 13 has been omitted, and the forward marginal end portion of the collar portion has not been deformed outwardly to form the retainer. Rather, member 41 is shown as being a double-ended stud having an externally-threaded rearward marginal end portion 42 matingly received in nut tapped through-hole 36, having an outwardly-extending annular flange 43, and having another marginal end portion 44 extending forwardly therefrom. As previously noted, flange 43 may be formed integrally with member 41, or may be formed as a separate element and simply threaded onto member 41. In this second form, the member is formed such that portion 42 may be threaded into nut hole 36 so that that flange 43 will tightly engage the left marginal end portion of the nut collar portion 31. Thus, the member flange 43 forms a ring-like or annular member analogous to ring 13, and the threaded connection between member threads 42 and nut threads 36 forms a type of retainer, analogous to retainer 14, for preventing unintended separation of the member flange from the nut collar portion.

Thus, the second embodiment 40 broadly includes a body 11, a nut 12, and a member 41.

Third Form (FIGS. 3-3G)

A third form of the improved fastener is generally indicated at 50 in FIGS. 3-3G.

This third form is shown as broadly including a body 11, nut 12, a resilient washer 51, and a ring 13.

Body 11 is, for all practical intents and purposes, substantially the same body of the first embodiment. Hence, a detailed description thereof will be omitted to avoid redundancy, the reader being referred to the description of the first embodiment for clarity.

Nut 12 is also generally similar to the nut of the first embodiment in that it has a head portion 30, a collar portion 31 with an outwardly-facing polygonal surface 33, and an out-turned forward marginal end portion 35 which forms a radially-enlarged retainer 14 for preventing unintended separation of ring 13 from the collar, as in the first form. The salient difference is that rather than having a tapped through-hole as in the first and second embodiments, this third embodiment has an axial tapped blind hole 52 that extends rearwardly into the nut from its forwardly-facing surface. Another difference with that a resilient cushioning washer 51 is received between the rear end surface of the body and a forwardly facing surface of the nut.

FIGS. 3D-3G show this third form of the fastener as being mounted on a wall, again indicated at 15. The plastically-deformed portion of the body is again indicated at 38.

Therefore, this third embodiment 50 broadly includes a body 11, a nut 12, a washer 51, and a ring 13 which is retained on the nut by means of the out-turned marginal end portion 35 of the nut collar portion.

Additional Forms (FIGS. 4-4A, 5-5A, 6-6A, 7-7A and 8-8A)

Additional forms and modifications of the fastener are generally shown in FIGS. 4-4A, 5-5A, 6-6A, 7-7A, and 8-8A. Because many of the portions have been previously described, detailed descriptions of these additional features will be omitted in the interest of clarity. Rather, only the salient differences or features will be described.

A fourth form is shown in FIGS. 4-4A. This fourth embodiment, generally indicated at 55, is shown as broadly including a body 11 and a nut 12. The ring and retainer are omitted from FIGS. 4 and 4A in the interest of clarity. These two missing elements could take any of the forms shown in the first three embodiments. The salient difference is that a thin-walled step tubular cover 56 is mounted on the body so as to encompass the nut. This cover 56 may be decorative, a dust cap, or the like.

A fifth form of the improved fastener is shown in FIGS. 5-5A. This fifth form, generally indicated at 58, is shown as including a tubular body 11, a nut 12, a ring 13, and a ring retainer 59 that is engaged with the forward marginal end portion of the nut collar portion.

A sixth form of the improved fastener is shown in FIGS. 6-6A. The sixth form, generally indicated at 60, is shown as including an elongated tubular body 11, a nut 12, and a split retaining ring 13. The salient difference here is that the distal marginal end portion of the nut collar portion is radially enlarged, as indicated at 16, to prevent ring 13 from separating from the collar portion.

A seventh form of the improved fastener is shown in FIGS. 7-7A. The seventh form, generally indicated at 62, is shown as broadly including an elongated tubular body 11, a nut 12, and a C-shaped retaining ring 63 which is adapted to be received in a suitable annular groove 64 provided in the nut collar portion. In this form, the nut is insertable into the body from its forward end, and the retaining ring is adapted to engage the rear surface of the body.

An eighth form of the improved fastener is shown in FIGS. 8-8A. This eighth form, generally indicated at 65, is shown as including an elongated tubular body 11, and a nut 12. In this form, the nut is adapted to be inserted into the body from its rearward end, and is retained by means of a retaining ring 66 that is received in a groove 68 provided on the nut collar portion.

In any of these forms, the elongated body my have a thin-walled polygonal transverse cross-section.

Therefore, while no fewer that eight different embodiments of the improved fastener have been shown and described, and several modifications thereof discussed, persons skilled in this art will readily appreciate the various additional changes and modifications may be made without departing from the spirit of the invention, as defined and differentiated by the following claims.

What is claimed is:

1. A rivet-like fastener adapted to be mounted in a hole provided through a wall, said wall having a forwardly-facing surface and an opposite rear-wardly-facing surface, said fastener comprising:

an elongated tubular body having a front end and a rear end, said body having a flange extending outwardly from said body adjacent said front end, said flange having a rearwardly-facing surface adapted to abut a marginal portion of said wall forwardly-facing surface about said hole, said body rear end having a rearwardly-facing surface, said body also having an inwardly-extending lug adjacent said body rear end, the axial extent of said lug being defined between said body rearwardly-facing surface and a forwardly-facing surface on said body;

a nut having a head portion and a collar portion extending forwardly from said head portion, said head portion having a forwardly-facing abutment surface adapted to face toward said body rearwardly-facing surface, said collar portion having an intermediate portion passing through said lug and terminating in a marginal end portion positioned forwardly of said body forwardly-facing surface;

a ring loosely surrounding said collar marginal end portion; and a retainer associated with said collar marginal end portion for preventing said ring from separating from said collar marginal end portion; and wherein radial space is provided between said body lug and said collar intermediate portion to permit said nut to move radially relative to said body.

2. A rivet-like fastener as set forth in claim 1 wherein said body rear-wardly-facing surface is annular.

3. A rivet-like fastener as set forth in claim 1 wherein said body forwardly-facing surface is annular.

4. A rivet-like fastener as set forth in claim 1 wherein said lug has an inwardly-facing polygonal surface, and wherein said collar intermediate portion has an outwardly-facing polygonal surface arranged to face toward said lug polygonal surface to prevent relative rotation between said nut and body.

5. A rivet-like fastener as set forth in claim 1 wherein said nut has an axial through-hole.

6. A rivet-like fastener as set forth in claim 5 wherein said nut through-hole is tapped.

7. A rivet-like fastener as set forth in claim 6, and further comprising:

a member having an externally-threaded marginal end portion matingly received in said tapped through-hole, and having another portion extending away from said member externally-threaded marginal end portion.

8. A rivet-like fastener as set forth in claim 7 wherein said member other portion is externally-threaded.

9. A rivet-like fastener as set forth in claim 1 wherein said nut has a blind hole.

10. A rivet-like fastener as set forth in claim 9 wherein said nut blind hole is tapped.

11. A rivet-like fastener as set forth in claim 10, and further comprising:

a member having an externally-threaded marginal end portion matingly received in said tapped through-hole, and having another portion extending away from said member externally-threaded marginal end portion.

12. A rivet-like fastener as set forth in claim 11 wherein said member other portion is externally-threaded.

13. A rivet-like fastener as set forth in claim 1 wherein said nut collar portion is formed integrally with said nut head portion.

14. A rivet-like fastener as set forth in claim 1 wherein an intermediate portion of said body is adapted to be deformed plastically outwardly to engage a marginal portion of said rearwardly-facing wall surface about said hole to hold said fastener to said wall.

15. A rivet-like fastener as set forth in claim 1 and further comprising:

a washer acting between said body second end and said nut head portion.

16. A rivet-like fastener as set forth in claim 15 wherein said washer is formed of a resilient material.

17. A rivet-like fastener as set forth in claim 1 wherein a portion of said collar marginal end portion is deformed plastically outwardly for preventing said ring from separating from said collar marginal end portion.

18. A rivet-like fastener as set forth in claim 1 wherein said ring is an annular member.

19. A rivet-like fastener as set forth in claim 18 wherein said collar portion is provided with a groove to receive a portion of said ring.

20. A rivet-like fastener as set forth in claim 1 wherein said ring is a C-shaped member.

* * * * *